(12) United States Patent
Qureshi et al.

(10) Patent No.: US 6,565,976 B1
(45) Date of Patent: May 20, 2003

(54) HIGH STRENGTH PULTRUSION RESIN

(75) Inventors: Shahid P. Qureshi, Duluth, GA (US); Harvey G. Dixon, Covington, GA (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 0 days.

(21) Appl. No.: 09/922,243

(22) Filed: Aug. 6, 2001

(51) Int. Cl.$^7$ .............................................. B32B 27/38

(52) U.S. Cl. .................. 428/413; 525/474; 525/476; 525/482; 525/481; 525/524; 528/27; 528/88; 528/419; 428/447; 264/134; 427/386; 427/387

(58) Field of Search ................................. 525/474, 476, 525/482, 481, 524; 528/27, 88, 419; 428/447, 413; 264/134; 427/386, 387

(56) References Cited

U.S. PATENT DOCUMENTS

| | | | |
|---|---|---|---|
| 3,843,577 A | | 10/1974 | Keil |
| 4,720,515 A | * | 1/1988 | Iji et al. |
| 5,102,960 A | | 4/1992 | Imai et al. |
| 5,700,417 A | * | 12/1997 | Fernyhough et al. |
| 5,736,619 A | | 4/1998 | Kane et al. |
| 5,739,217 A | | 4/1998 | Hagiwara et al. |
| 5,753,722 A | | 5/1998 | Itokawa et al. |
| 6,153,719 A | | 11/2000 | Abbey et al. |
| 6,159,405 A | | 12/2000 | Taylor |

FOREIGN PATENT DOCUMENTS

EP    430 254    *    6/1991

OTHER PUBLICATIONS

Chen–Chi M. Ma, et al., Pultruded Fiber Reinforced Novolac Type Phenolic Composite—Processability, Mechanical Properties and Flame Resistance, Composites: Part A 28A (1997) pp. 895–900.

Chen–Chi M. Ma, et al., Pultruded Fiber Reinforced Poly (ethylene oxide) Toughened Novolac Type Phenolic Type Phenolic Resin: Mechanical Properties, Thermal Stability, and Flame Retardance; 20$^{th}$ Int. SAMPE Tech. Conf. Oct. 28–Nov. 1, 1997; pp. 653–664.

Chen–Chi M Ma, et al., Blocked Diisocyanate Polyester—Toughened Novolak–Type Phenolic Resin: Syntheses, Characterization, and Properties of Composites; Journal of Applied Polymer Science, vol. 69, pp. 1119–1127 (1998).

Chen–Chi M. Ma, et al.; Mechanical, Thermal Stability, and Flame Retardance of Pultruded Fiber–Reinforced Poly (ethylene oxide)—Toughened Novolak–Type Phenolic Resin; Journal of Applied Polymer Science, vol. 69, 1129–1136 (1998).

C. S. Tyberg, et al.; Tough, Void–Free Flame Retardant Phenolic Composites: Processability and Properties, 44$^{th}$ International SAMPE Symposium, May 23–27, 1999.

* cited by examiner

*Primary Examiner*—Robert Dawson
*Assistant Examiner*—Kuo-Liang Peng
(74) *Attorney, Agent, or Firm*—Banner & Witcoff, Ltd.

(57) ABSTRACT

A pultrusion resin composition comprising about 75 wt % to about 85 wt % of a phenolic resin, about 9 wt % to about 20 wt % of the reaction product of a polyhydroxy compound and an epoxy-functional polysiloxane, about 6 wt % to about 15 wt %, of a phenolic epoxy, and about 0.2 wt % to about 1 wt % of a catalyst, based on total weight of the composition. Pultruded products are formed by drawing fibrous reinforcement through a bath of the pultrusion resin composition.

20 Claims, 1 Drawing Sheet

HIGH STRENGTH PULTRUSION RESIN

FIELD OF THE INVENTION

The invention relates to high strength phenolic composites made by pultrusion process.

BACKGROUND OF THE INVENTION

The term "pultrusion" means a method of drawing a plurality of fibrous reinforcement coated with a binder solution through a heated die in order to shape the fibrous reinforcement and binder into a unitary article of desired shape.

Fibrous reinforcement, such as glass fibers, allows the formation of varying shapes by the pultrusion process. This process provides a composite structural member, which is typically stronger and lighter and may be less expensive than similarly sized single material members, such as wood. Such fiber-reinforced structures can be used as a substitute product to conventional wood or metal structural materials.

A schematic for a pultrusion process is shown in U.S. Pat. No. 5,456,781. A plurality of fiber rovings is pulled through a resin bath and then a forming die and subsequently through a heated die that cures the resin materials and shapes the rovings and resin. Although glass fiber has been mentioned as the fiber filaments or rovings, other materials, including synthetic fibers, carbon fibers, natural fibers and inorganic fibers, e.g. ceramic, can be used in the form of filaments, rovings or mats. Suitable for use as synthetic fibers in tension are aramid fibers, which are commercially available from E.I. Dupont de Nemours & Company of Delaware under the trademark "KEVLAR" and high modulus polyethylene, which is available under the trademark "SPECTRA" from Allied Fibers of Allied Signal, Petersburg, Va.

Phenolic resin systems containing resorcinol, such as a commercially available phenolic resin system containing about 0–60% resorcinol, suitable for the protrusion process are commercially available under the trade designation GP4221 from Georgia-Pacific Resins Inc.

Other phenolic resin systems for pultrusion composites are described in U.S. Pat. Nos. 5,075,413; 5,075,414; and 159,405. This patent discloses a reaction product of a resorcinol component such as a resorcinol formaldehyde novolac resin formed as the reaction product of resorcinol, an aldehyde and an acidic catalyst. The resorcinol component is reacted with a phenolic resole resin such as phenol-formaldehyde. The resulting compositions are suitable for pultrusion processes and exhibit fire resistance.

BRIEF SUMMARY OF THE INVENTION

The invention is directed to a high strength pultrusion resin composition comprising a phenolic resin and an elastomeric component. In particular the present invention is directed to a pultrusion resin composition comprising about 75 wt % to about 85 wt % of a phenolic resin, about 9 wt % to about 20 wt % of the reaction product of a polyhydroxy compound and an epoxy functional polysiloxane, about 6 wt % to about 15 wt %, of a phenolic epoxy, and about 0.2 wt % to about 1 wt % of a catalyst, based on total weight of the composition.

The invention is further directed to a pultruded product prepared with the high strength pultrusion resin composition and a plurality of fibrous reinforcement.

The invention is also directed to a method of preparing a pultruded product comprising drawing a plurality of fibrous reinforcement through a bath of the high strength resin composition bath wherein the elastomeric component is added to the phenolic resin prior to or during the pultrusion process.

DETAILED DESCRIPTION OF THE INVENTION

Figure 1:
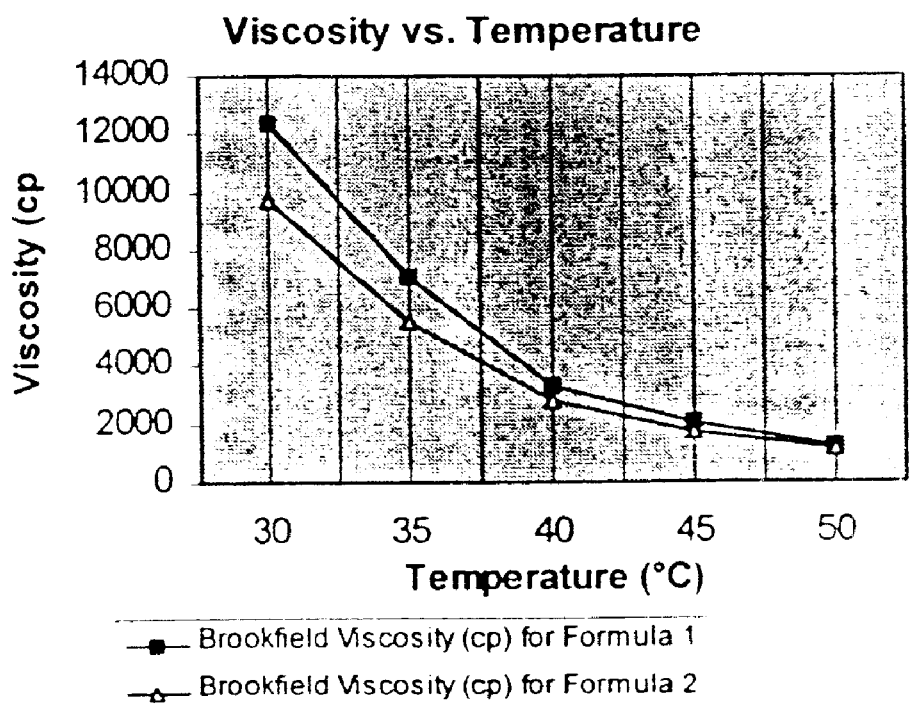
FIG. 1 depicts a graph of viscosity versus temperature for two resins of the invention.

The present invention is directed to a new high strength pultrusion resin composition comprising a phenolic resin modified with an elastomeric component. More particularly, the pultrusion resin composition comprises a phenolic resin, the reaction product of a polyhydroxy compound and an epoxy functional polysiloxane, a phenolic epoxy resin, and a catalyst.

The elastomeric component of the pultrusion resin provides flexural strength to the pultruded product. The elastomeric component may be incorporated into the phenolic resin prior to, or during, the pultrusion process. The elastomeric component preferably has novolac hydroxyl functionality to allow the hydroxyl to react with an epoxy to become part of the cured phenolic resin.

In an embodiment of the invention, the high strength phenolic resin composition comprises about 75 wt % to about 85 wt %, preferably about 80 wt % to about 85 wt %, of a phenolic resin, about 9 wt % to about 20 wt %, preferably about 10 wt % to about 15 wt %, of the reaction product of a polyhydroxy compound and an epoxy functional polysiloxane, about 6 wt % to about 15 wt %, preferably about 8 wt % to about 10 wt %, of a phenolic epoxy, and about 0.2 wt % to about 1 wt %, preferably about 0.4 wt % to about 0.6 wt %, of a catalyst.

Any phenolic resole systems used in pultrusion processes can be used with the present invention. For example, the phenolic resole resin may be prepared, for example, by reacting phenol and formaldehyde typically in the presence of a basic catalyst, such as sodium hydroxide or an amine such as hexamine, at a temperature below about 95° C., preferably between about 45° C. and about 85° C. Generally, the formaldehyde to phenol mole ratio in the phenolic resole resin is about 0.8 to about 4, preferably about 1 to about 2 moles. The basic catalyst to phenol mole ratio in preparing the phenolic resole resin is from about 0.001 to about 0.1 moles of catalyst per mole of phenol, preferably from about 0.005 to about 0.05. The term phenol is used generically to encompass any suitable phenolic compound.

The elastomeric component is formed from the reaction product of a polyhydroxy compound and an epoxy-functional polysiloxane in the presence of a catalyst. Preferably, the polyhydroxy compound is reacted with an epoxy-functional polysiloxane in the presence of the catalyst at a temperature of between about 180° C. and about 250° C. for about 1 to about 7 hours.

The resulting reaction product is then blended with a phenolic epoxy. The phenolic resin may be combined with a phenolic epoxy prior to or after the addition of the reaction product.

The polyhydroxy compound may be any suitable polyhydroxy compound such as resorcinol, phenol-formaldehyde novolac, cresol novolac, t-butyl novolac or bis A novolac. Preferably the polyhydroxy compound is resorcinol.

The epoxy-functional polysiloxane include those described in EP 0 428 871 which is hereby incorporated by reference in its entirety. Specifically, the formulas identified as formulas (I) and (II) and specific epoxy-functional polysiloxanes as identified by organopolysiloxanes I-1 to I-8, II-1 to II-7, III-1 to III-7, IV-1 to IV-7, and V-1 to V-7.

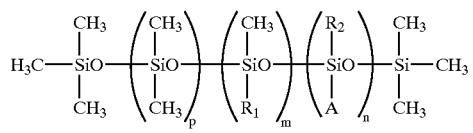  (I)

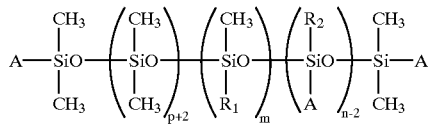  (II)

wherein:

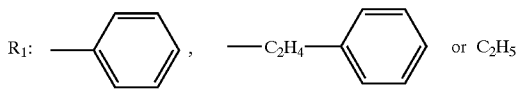

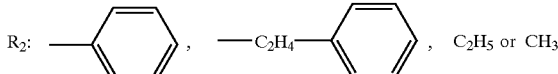

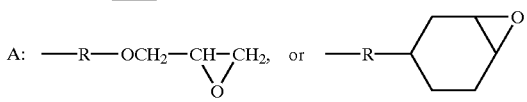

and R is a lower alkylene group;
$10 \leq N = p+m+n+2 \leq 200$
$0 \leq m/N \leq 0.1$, and $5 \leq N/n \leq 50$ The epoxy-functional polysiloxane also include OSI Witco Y-12940 and OSI Witco Y-14362. Other epoxy-functional polysiloxanes include, but are not limited to, Dow Corning 2-8065, DC Toray Silicones BY 1-2940, ShinEtsu KF-105, ShinEtsu X-22-163A, Shin Etsu X-22-163B, and ShinEtsu X-22-163C Generally, from about 0.1 to about 10 moles, preferably from about 2 to about 3, of polyhydroxy compound is present per mole of epoxy in the polysiloxane.

An example of reacting resorcinol with an epoxy-functional polysiloxane may be found in copending application Serial No. 09/511,350, which is hereby incorporated by reference in its entirety. In this example, 100 parts of resorcinol are heated to 195° C., and a blend of 2 parts of benzyldimethylamine and 222 parts of epoxy-functional polysiloxane are added over 5 hours while maintaining a temperature of 195° C. The material is then further heated for 2 hours to make a phenolic-functionalized polysiloxane.

The phenolic epoxy may be a bis-phenol epoxy such as bis-phenol F epoxy or bis-phenol A epoxy. Preferably the epoxy is bis-phenol F epoxy. Other epoxy resins are described in U.S. Pat. No. 4,086,250, which is hereby incorporated by reference in its entirety.

The catalyst promotes the reaction of phenolic-functional polysiloxane and phenolic epoxy. The catalyst may be any suitable base catalyst such as 2-methyl imidazole, 4-methyl imidazole, and tertiary amines such as triethyl amine, benzyldimethylamine, triethanolamine. Preferably, the catalyst is 2-methyl imidazole.

The resin composition is used in the pultrusion process. The ingredients may be mixed prior to or during the pultrusion process For example, the phenolic resole resin and phenolic epoxy are mixed and then phenolic-functional siloxane is blended. This mixture is stored as stock solution at 5° C. for future production. Prior to the pultrusion process, the mixture is warmed to ambient conditions and then the imidazole catalyst is added. The mixture is kept at 40° C. in an oven and then poured into resin bath of pultrusion equipment. During the pultrusion process implies that only phenolic resin is stored as stock product and then prior to the pultrusion process, the resin is mixed with phenolic-functional polysiloxane, phenolic epoxy and catalyst.

The fibrous reinforcement may be prepared by grouping filaments together into strands or fibers, which then may be grouped together into twisted strands to form yarns, or untwisted strands to form rovings of a fibrous material or which may be bound together as continuous or chopped strands to form mat, such as of a glass, ceramic, carbon, metal, thermosetting or thermoplastic resin, or natural fibers. The fiber reinforcement, whether strands, fibers, yarns, rovings, or mats, are drawn through a bath of liquid resin and then through a pultrusion die to shape the fibrous reinforcement and resin. The resin is then cured.

Suitable fibers include any of the fibers known for pultrusion processes in the prior art, including but not limited to natural fibers, paper fibers, carbon fibers, ceramic fibers, metal fibers, synthetic resin fibers, including thermosetting and thermoplastic types, especially aramid fibers and high modulus polyethylene, glass fibers, other inorganic fibers including composite ceramic fibers and metal fibers, and combinations thereof. Specific fibers include KEVLAR, and NOMEX honeycomb.

The content of the fibrous reinforcement and nature thereof will vary according to the desired strength but usually is in a range of 60–85% by weight, preferably 70–80% by weight.

During the pultrusion process, the viscosity of the pultrusion resin composition is preferably controlled by increasing or decreasing the temperature of the resin bath. Alternatively, a solvent may be added to the resin. Preferably, the resin does not contain a solvent.

EXAMPLE 1

Six-inch wide ¼ inch thick pultruded composites were prepared with compositions described in Table 1. The gel time is the time when the resin is no longer stringy on the hot plate and is no longer workable. The cure time is the time when the resin is and is hard on the hot plate.

TABLE 1

| Formula: | 1 | 2 | 3 | 4 | 5 | 6 | 7 |
|---|---|---|---|---|---|---|---|
| Phenolic resole resin | 80 g | 80 g | 80 g | 80 g | 80 g | 100 g | 80 g |
| Reaction product of resorcinol and epoxy siloxane | 13 g | 13 g | 13 g | 13 g | 13 g | 13 g | 13 g |
| Bis-phenol A epoxy | 7 g | — | 7 g | | | | |

TABLE 1-continued

| Formula: | 1 | 2 | 3 | 4 | 5 | 6 | 7 |
|---|---|---|---|---|---|---|---|
| Bis-phenol F epoxy | | 7 g | | 7 g | | | 7 g |
| 4-methyl imidazole | .5 g | .5 g | | | | | |
| 2-methyl imidazole | | | | | | | .5 g |
| Gel Time @ 150° C., sec | 180 | 175 | 190 | 200 | 250 | 270 | 138 |
| Cure Time @ 150° C., sec | 350 | 450 | 680 | 680 | 780 | 700 | 483 |
| Appearance @ RT | milky, tan, opaque | milky, tan, opaque | milky, tan, opaque | milky, tan, opaque | milky, tan, opaque | transparent, brown | milky, tan, opaque |

Formulas 1, 2, and 7 had the fastest gel and cure times. Formulas 3 and 4 were the same as formulas 1 and 2 except formulas 3 and 4 do not have a catalyst. Formulas 3 and 4 had higher gel times and cure times. It is believed that the gel and cure times were higher due to the lack of catalyst in formulas. Formula 7 had a different catalyst than the catalyst used in Formulas 1 and 2. The catalyst 2-methylimidazole is a more reactive catalyst than 4-methylimidazole. Although the melting point of the 2-methylimidazole (142° C.) is much higher than the melting point of the 4-methylimidazole (54° C.), the 2-methylimidazole is preferred because temperature of the pultrusion is in excess of 225° C. and thus melting point temperature is not a factor.

Formulas 1 and 2 were tested for viscosity versus temperature. The bis-phenol F epoxy had a lower viscosity than the bis-phenol A epoxy. Moreover, in both formulas, as the temperature increases, the viscosity decreases. See FIG. 1. Thus, the viscosity can be controlled by changing the temperature of the resin bath during the pultrusion process instead of adding solvent to the bath. Formula 7 should have viscosities comparable to Formula 2 since they are the same except for the catalyst.

EXAMPLE 2

Neat resin castings were prepared using the reaction product of resorcinol and epoxy polysiloxane, 0.5 pph of 4-methyl imidazole, and either bis-phenol A epoxy or bis-phenol F epoxy. The pultruded parts were tested for flexural strength and for flammability. The castings of both formulas were tough but the castings made with bis phenol A epoxy were translucent compared to the ones made with bis-phenol F epoxy, which were opaque.

Based on the results of Examples 1 and 2, the following are preferred formulas for the pultrusion resin.

TABLE 2

| Formula: | 8 | 9 |
|---|---|---|
| Phenolic resole resin | 79.6 g | 79.6 g |
| Reaction product of resorcinol and epoxy siloxane | 11.9 g | 11.9 g |
| Bis-phenol A epoxy | 8 g | — |
| Bis-phenol F epoxy | | 8 g |
| 2-methyl imidazole, gram | 0.5 g | 0.5 g |

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A pultrusion resin composition comprising about 75 wt % to about 85 wt % of a phenolic resin, about 9 wt % to about 20 wt % of the reaction product of a polyhydroxy compound and an epoxy-functional polysiloxane, about 6 wt % to about 15 wt %, of a phenolic epoxy, and about 0.2 wt % to about 1 wt % of a catalyst, based on total weight of the composition.

2. The pultrusion resin composition of claim 1 wherein the resin composition comprises about 80 wt % to about 85 wt % of the phenolic resin, about 10 wt % to about 15 wt % of the reaction product of a polyhydroxy compound and an epoxy-functional polysiloxane based on total weight of the composition.

3. The pultrusion resin composition of claim 1 wherein the resin composition comprises about 8 wt % to about 10 wt % of phenolic epoxy based on total weight of the composition.

4. The pultrusion resin composition of claim 1 wherein the phenolic resin has a formaldehyde to phenol mole ratio of about 1:1 to about 2:1.

5. The pultrusion resin composition of claim 1 wherein the polyhydroxy compound and an epoxy-functional polysiloxane are first reacted in the presence of a catalyst, and then blended with a phenolic epoxy.

6. The pultrusion resin composition of claim 1 wherein the polyhydroxy compound is reacted with an epoxy-functional polysiloxane at a temperature of between about 180° C. and about 250° C.

7. The pultrusion resin composition of claim 6 wherein the polyhydroxy compound is reacted with an epoxy-functional polysiloxane for about 1 to about 7 hours.

8. The pultrusion resin composition of claim 1 wherein the polyhydroxy compound is selected from the group consisting of resorcinol, phenol-formaldehyde novolac, cresol novolac, t-butyl novolac and bis A novolac.

9. The pultrusion resin composition of claim 8 wherein the polyhydroxy compound is resorcinol.

10. The pultrusion resin composition of claim 1 wherein the epoxy-functional polysiloxane is epoxy polysiloxane or a compound of formula (I) or (II):

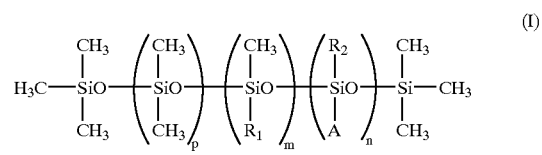

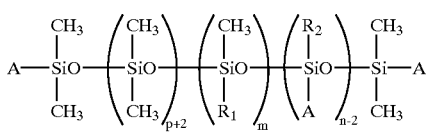

wherein:

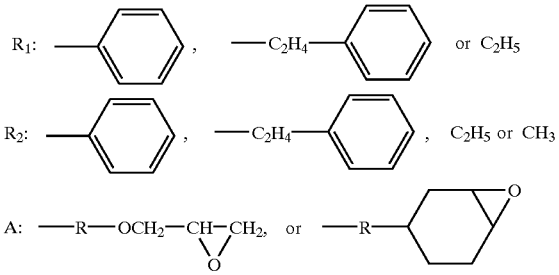

and R is $C_2H_4$ or $C_3H_6$;

$10 \leq N = p+m+n+2 \leq 200$ and $0 \leq m/N \leq 0.1$, and $5 \leq N/n \leq 50$.

11. The pultrusion resin composition of claim 1 wherein from about 0.1 to about 10 moles of polyhydroxy compound is present per mole of epoxy in the polysiloxane.

12. The pultrusion resin composition of claim 11 wherein from about 2 to about 3 moles of polyhydroxy compound is present per mole of epoxy in the polysiloxane.

13. The pultrusion resin composition of claim 1 wherein the phenolic epoxy is bis-phenol F epoxy or bis-phenol A epoxy.

14. The pultrusion resin composition of claim 13 wherein the phenolic epoxy is bis-phenol F epoxy.

15. The pultrusion resin composition of claim 1 wherein the catalyst is selected from the group consisting of 2-methyl imidazole, 4-methyl imidazole, triethyl amine, benzyldimethylamine, and triethanolamine.

16. The pultrusion resin composition of claim 15 wherein the catalyst is 2-methyl imidazole.

17. A pultruded product comprising fibrous reinforcement and the pultrusion resin composition of claim 1 prepared by drawing the fibrous reinforcement through a bath of the pultrusion resin composition.

18. A process of forming a pultruded product comprising drawing a plurality of fibrous reinforcement through a bath of the pultrusion resin composition of claim 1 to form a resin impregnated fiber reinforcement.

19. The process of claim 18 further comprising shaping the resin impregnated fiber reinforcement in a pultrusion die.

20. The process of claim 18 wherein the pultrusion resin composition is formed in situ in the bath.

* * * * *